United States Patent
Podolski et al.

(10) Patent No.: US 12,415,397 B2
(45) Date of Patent: Sep. 16, 2025

(54) VEHICLE ROOF COMPRISING AN ENVIRONMENT SENSOR AND A COOLING FEATURE

(71) Applicant: Webasto SE, Stockdorf (DE)

(72) Inventors: Thomas Podolski, Stockdorf (DE); Juraj Lehotsky, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 407 days.

(21) Appl. No.: 18/187,409

(22) Filed: Mar. 21, 2023

(65) Prior Publication Data
US 2023/0302870 A1    Sep. 28, 2023

(30) Foreign Application Priority Data
Mar. 23, 2022   (DE) .............. 10 2022 106 885.4

(51) Int. Cl.
*B60H 1/00*    (2006.01)
(52) U.S. Cl.
CPC ..... *B60H 1/00271* (2013.01); *B60H 1/00207* (2013.01); *B60H 2001/00235* (2013.01)
(58) Field of Classification Search
CPC ............ B60H 1/00271; B60H 1/00207; B60H 2001/00235
See application file for complete search history.

(56) References Cited

U.S. PATENT DOCUMENTS

| 10,099,630 | B1 * | 10/2018 | Krishnan | ............ | G01S 7/4813 |
| 11,240,941 | B2 * | 2/2022 | Frederick | ............ | G05D 1/0088 |
| 11,858,425 | B2 * | 1/2024 | Higashimachi | ......... | B60R 11/00 |
| 12,092,755 | B2 * | 9/2024 | Huelsen | ............... | G01S 7/4813 |
| 12,172,604 | B2 * | 12/2024 | Huelsen | ............... | B62D 25/06 |
| 12,319,349 | B2 * | 6/2025 | Huelsen | ............... | B62D 27/026 |
| 2020/0084920 | A1 | 3/2020 | Frederick et al. | | |
| 2022/0161860 | A1 | 5/2022 | Friedrich et al. | | |
| 2023/0073687 | A1 * | 3/2023 | Lindner | ............... | B60H 1/245 |

FOREIGN PATENT DOCUMENTS

| CN | 115743315 A | * | 3/2023 | .............. B62D 25/06 |
| DE | 102019124362 A1 | | 3/2020 | |
| DE | 102019105339 A1 | | 9/2020 | |
| DE | 102020102874 A1 | | 8/2021 | |
| KR | 19980061886 A | * | 10/1998 | ......... B60H 1/00978 |

OTHER PUBLICATIONS

Examination report dated Dec. 12, 2022, for companion application in Germany (German with English machine translation); 9 pages.

* cited by examiner

*Primary Examiner* — Faye M Fleming
(74) *Attorney, Agent, or Firm* — Fitch, Even, Tabin & Flannery, LLP (57) ABSTRACT

A vehicle roof, in particular for a passenger car, the vehicle roof having a one-part or multi-part roof skin, at least one environment sensor for detecting a vehicle environment, the environment sensor being disposed below the roof skin and being able to detect the vehicle environment through a sensor see-through area of the roof skin, and a cooling feature for cooling the environment sensor, at least part of the cooling feature being disposed in a wet area, and the environment sensor being disposed in the wet area.

14 Claims, 6 Drawing Sheets

VEHICLE ROOF COMPRISING AN ENVIRONMENT SENSOR AND A COOLING FEATURE

CROSS-REFERENCE TO RELATED APPLICATION

This application claims priority from German Patent Application Number 10 2022 106 885.4, filed on Mar. 23, 2022, which is hereby incorporated herein by reference in its entirety for all purposes.

FIELD

The invention relates to a vehicle roof, in particular a vehicle roof for a passenger car, the vehicle roof comprising an environment sensor for detecting a vehicle environment, the environment sensor being disposed under a roof skin, and a cooling feature for cooling the environment sensor.

BACKGROUND

A roof of this kind is known from practice and can be a roof module which can be placed on top of a vehicle body of a passenger car, which forms a vehicle carcass, as a separate structural unit. The vehicle body comprises roof rails as points of intersection with the vehicle roof, the roof rails being longitudinal rails and/or transverse rails and serving as a support of the vehicle carcass. The vehicle roof comprises a roof skin, which forms a visible outer surface and has sensor see-through areas, through which the environment sensors, which serve to detect a vehicle environment and are disposed under the roof skin, can detect the vehicle environment.

For example, autonomously or semi-autonomously driving vehicles comprise a roof which is a roof sensor module (RSM) and which is equipped with a plurality of environment sensors. The environment sensors, which are integrated in the vehicle roof, which is in particular a roof module, in a dry area and which are lidar sensors and/or radar sensors and/or cameras, detect the environment surrounding the vehicle and provide control electronics of the vehicle in question with measuring signals, allowing a current traffic situation to be determined and the driving behavior of the vehicle in question to be adapted to said traffic situation. In order to ensure that the environment sensors are available without interruption, they have to be kept in a certain temperature range, for which purpose a thermal feature, which is configured as a cooling feature, is employed. For example, the cooling feature comprises heat pipes, which are connected to the environment sensors disposed in the dry area. The division of the vehicle roof into dry areas and wet areas presents an enormous challenge for the sealing system to be integrated. Hence, the architecture of cooling features which have been used for cooling the environment sensors of vehicle roofs so far is complex.

SUMMARY

The object of the invention is to provide a vehicle roof in which at least one environment sensor and the cooling feature for the environment sensor are optimized.

According to the invention, this object is attained by the vehicle roof having the features of claim 1.

So the invention proposes a vehicle roof, in particular a vehicle roof for a passenger car, which comprises a one-part or multi-part roof skin, at least one environment sensor for detecting a vehicle environment, the environment sensor being disposed under the roof skin and being able to detect the vehicle environment through a sensor see-through area of the roof skin, and a cooling feature for cooling the environment sensor. At least part of the cooling feature is disposed in a wet area. The environment sensor is also disposed in the wet area.

So the environment sensor of the vehicle roof according to the invention is disposed in a wet area, in which water can enter from outside. Since the environment sensor is disposed below the roof skin, which is a cladding or cover, heat can build up in the area of the environment sensor because of the sensor operation and/or external heat. Hence, at least part of the cooling feature is also disposed in the wet area, the cooling feature being configured to aspirate air in particular through an inlet of the roof skin; the air can be used to cool the environment sensor and then be expelled again through an outlet provided in particular in the roof skin. In this manner, the operating temperature of the environment sensor can be kept below a critical limit temperature, which is 85° C., for example, or the temperature of the environment sensor can be quickly brought below this limit temperature by simple constructive means. Heat building up because of the ambient temperature or sunlight or the waste heat of the environment sensor can be discharged effectively. This is an improved way of ensuring uninterrupted sensor availability.

The environment sensor of the vehicle roof according to the invention can be configured in various ways, can use electromagnetic radiation and/or acoustic waves and can comprise a lidar sensor, a radar sensor, an optical sensor, such as a camera, an antenna device and/or the like, for example.

If the environment sensor is a lidar sensor, it preferably operates in a wavelength range of about 905 nm or about 1550 nm. A camera used as an environment sensor can operate in the wavelength range of visible light and/or in the infrared range.

The roof skin of the vehicle roof according to the invention is composed of one part or multiple parts and at least partially covers the environment sensor, which can be part of a sensor module. Furthermore, the roof skin comprises a sensor see-through area, which is in particular window-like and transparent to the wavelength range used by the environment sensor. The sensor see-through area can be closed and form an integral part of the roof skin or an insert of such an integral part in this case. The sensor see-through area can also be a cutout engaged by the environment sensor with a housing or the like. In this case, the environment sensor itself forms a part of the roof skin visible from outside and located within the roof skin cutout.

The sensor see-through area is transparent in particular for a wavelength range between 300 nm and 2000 nm. Moreover, it is also advantageous for the sensor see-through area to be transparent to radar radiation.

In order to achieve effective air circulation, a preferred embodiment of the vehicle roof according to the invention is configured in such a manner that the cooling feature comprises at least one air duct in which a fan is disposed. The fan aspirates fresh cooling air and also expels it again, in particular through the inlet formed in the roof skin and the outlet formed in the roof skin. The air duct is associated with the wet area of the vehicle roof. Thus, the fan disposed in the air duct is also associated with the wet area.

In a specific embodiment of the vehicle roof according to the invention, a cooling element is disposed in the air duct, the cooling element being exposed to an air flow in the air duct and being connected to a base of the environment sensor via at least one thermally conductive element, which can be what is referred to as a heat pipe. The thermally conductive element can be disposed in a dry area of the vehicle roof, which is sealed from the wet area. The base of the environment sensor is adjacent to said dry area.

For example, the base of the environment sensor is inserted in a cutout of a support, the support being covered by the roof skin and preferably formed by a roof frame. The cutout allows the thermally conductive element to be effectively connected to the environment sensor located in the wet area. The environment sensor is placed on top of the support directly or indirectly via a holder, preferably in such a manner that a circumferential seal, which interacts with the support and surrounds the cutout, is disposed at the base of the environment sensor.

The base of the environment sensor can be formed by the holder, which forms a closed tray or a support plate and which is attached to the support in particular from above. Thus, the environment sensor can be installed from outside, i.e., completely in the wet area. Thermally conductive paste can be disposed between the holder and the environment sensor.

If the environment sensor is placed on top of the support without a holder, a flat rubber mat or the like can be provided between the environment sensor and the support for sealing, for example. The rubber mat has to have recesses for the at least one thermally conductive element.

In another specific embodiment of the vehicle roof according to the invention, air-guiding ribs can be formed on the inner side of the roof skin for forming the air duct. These air-guiding ribs can be produced in one piece with the roof skin, which is in particular made of plastic. This is a cost-efficient and robust embodiment, which is additionally easy to install and replace. Few components are required while the cooling efficiency is high.

The environment sensor can be located in the air duct formed by the air-guiding ribs so that no additional constructive components for air-guiding purposes are needed. In this way, the air flowing through the air duct flows directly around the environment sensor and cools it.

In order to keep the environment sensor accessible as easily as possible for installation and maintenance purposes, the roof skin can comprise at least one removable dome under which the environment sensor is disposed and which in particular also comprises the sensor see-through area. The dome, which can in particular be detached, can be snap-locked and/or glued and/or screwed to adjacent areas of the roof skin. A fan of the cooling feature can also be disposed under the dome and thus be located in the wet area together with the environment sensor. The cooling solution limited to the wet area saves seal interfaces in the direction of the vehicle interior. Further, on the inner side of the dome, the airduct can be provided, which may be realized by air-guiding ribs formed on the inner side of the dome, in particular in an integrated manner, i.e. the dome on the air-guiding ribs are made from one part. In addition, the dome can comprise an air inlet and/or an air outlet.

A preferred embodiment of the roof according to the invention is a roof module. In an integrated manner, such a roof module forms a structural unit which accommodates components required for autonomous or semi-autonomous driving of the vehicle in question. Thus, the roof module, in which a plurality of functional elements can be integrated accordingly, is a compact structural unit, which is connected to a vehicle body or a vehicle carcass, which comprises roof rails, such as roof side rails and/or longitudinal roof rails, by a vehicle manufacturer. Thus, the vehicle roof configured as a roof module is a roof sensor module (RSM), which enables the vehicle in question to drive autonomously or semi-autonomously.

In an autonomous driving mode, a vehicle equipped with the vehicle roof according to the invention and configured as an autonomously driving vehicle drives on its own at least without substantial intervention of a driver. In a semi-autonomous driving mode, the vehicle roof according to the invention forms part of a driver assistance system, for example.

The vehicle roof according to the invention can be provided with a transparent fixed roof portion and/or a roof opening system for a roof opening.

In particular, the vehicle roof according to the invention is a roof of a passenger car. However it can also be a roof of a utility vehicle, which is a delivery van, a bus, an autonomously driving small bus, such as what is known as a people mover, or a tractor unit of a truck.

The invention also relates to a motor vehicle which comprises a vehicle roof of the kind described above and whose vehicle carcass, in particular, can be provided with a roof module configured as a roof sensor module.

Other advantages and advantageous configurations of the subject matter of the invention are apparent from the description, the drawing and the claims.

BRIEF DESCRIPTIONS OF THE DRAWINGS

Exemplary embodiments of a motor vehicle having a vehicle roof according to the invention are schematically illustrated in the drawing and will be discussed in more detail in the following description.

DETAILED DESCRIPTION

Figure 1:
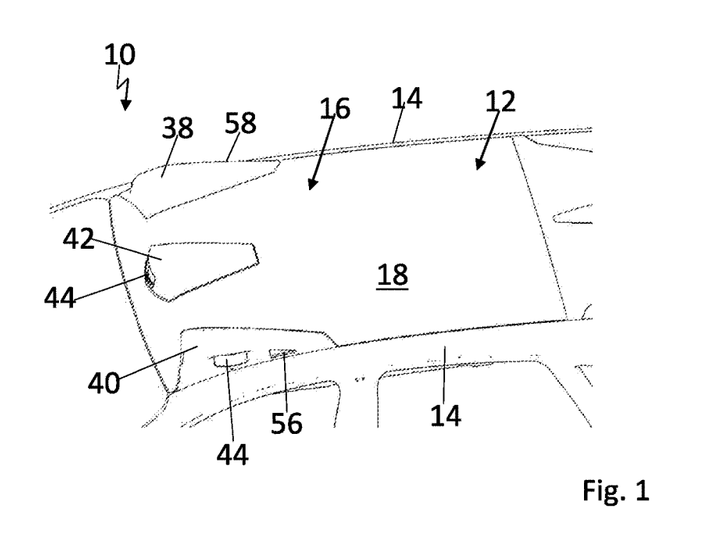
FIG. 1 is a perspective top view of a motor vehicle having a roof module according to the invention.
Figure 2:
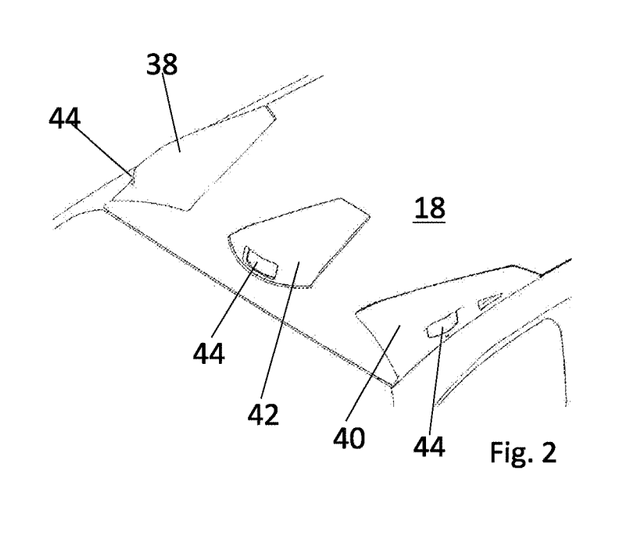
FIG. 2 is a second perspective top view of the vehicle having the roof module.
Figure 3:
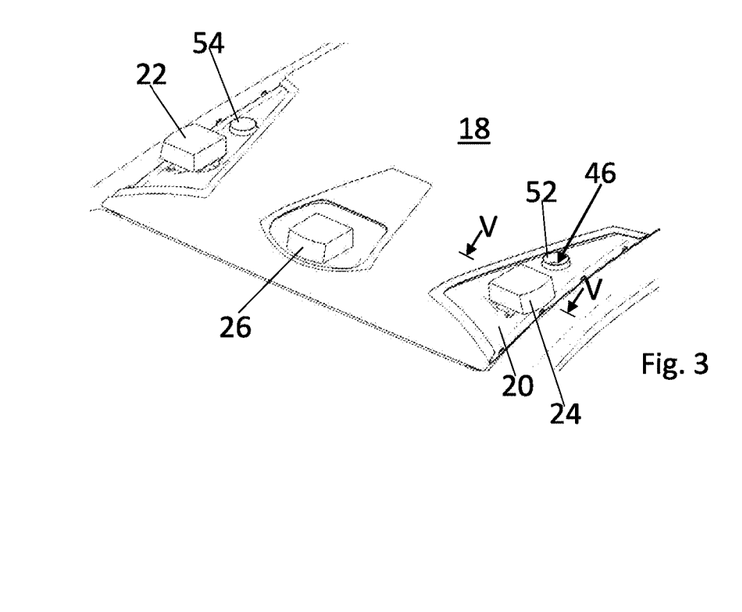
FIG. 3 is a view corresponding to FIG. 2 but with a roof skin element removed.
Figure 4:
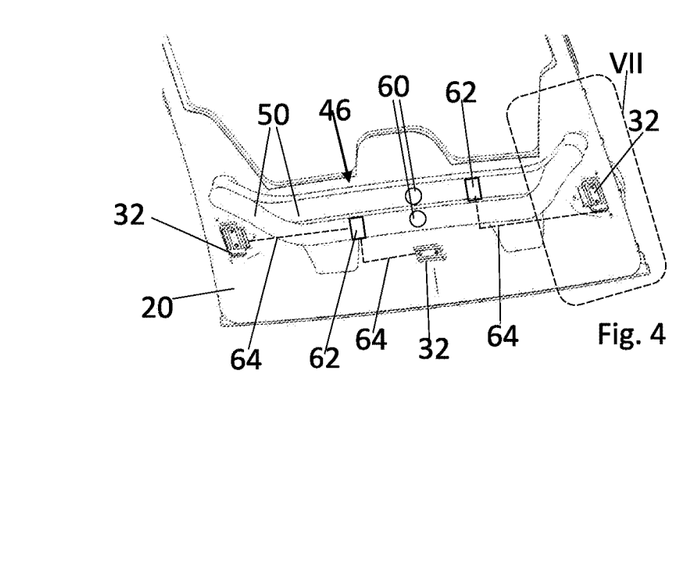
FIG. 4 is a perspective bottom view of the roof module.
Figure 5:
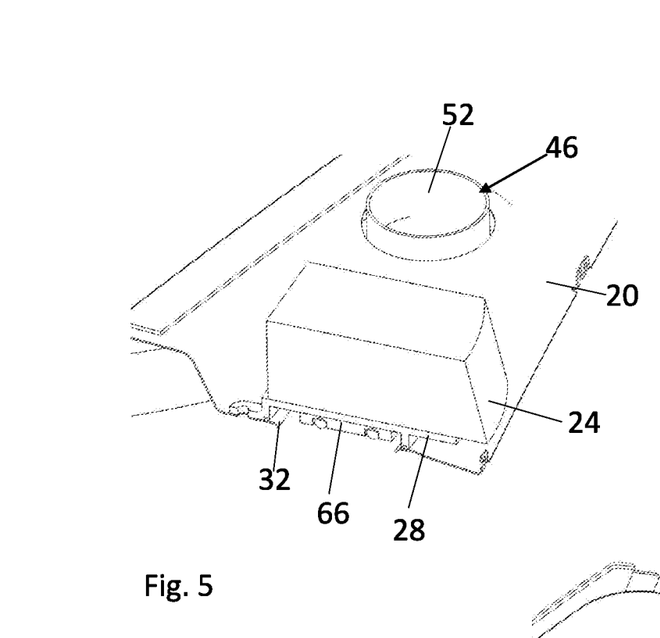
FIG. 5 is a perspective section view of the roof module along line V-V in FIG. 3.
Figure 6:
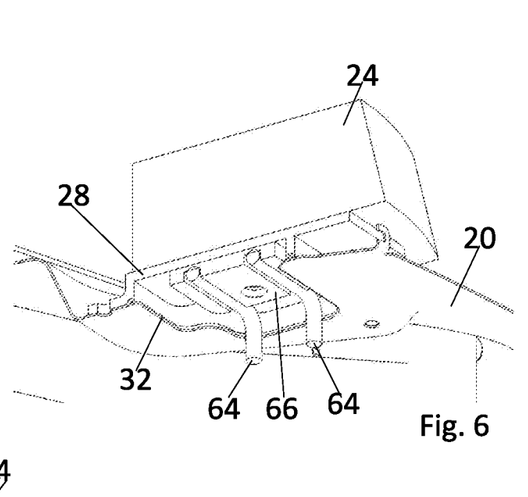
FIG. 6 is a second perspective section view along line V-V in FIG. 3.
Figure 7:
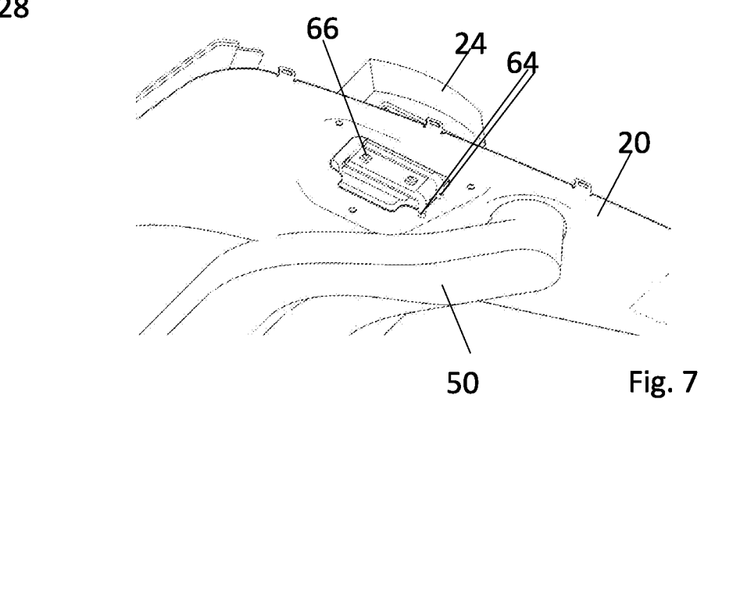
FIG. 7 is a perspective bottom view of the roof module in area VII in FIG. 4.
Figure 8:
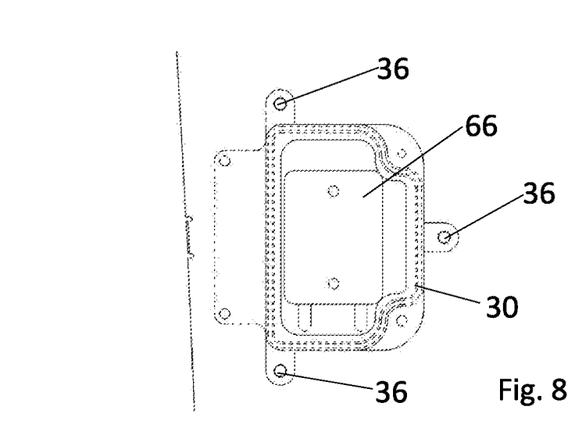
FIG. 8 is a bottom view of the roof module in the area of an environment sensor.
Figure 9:
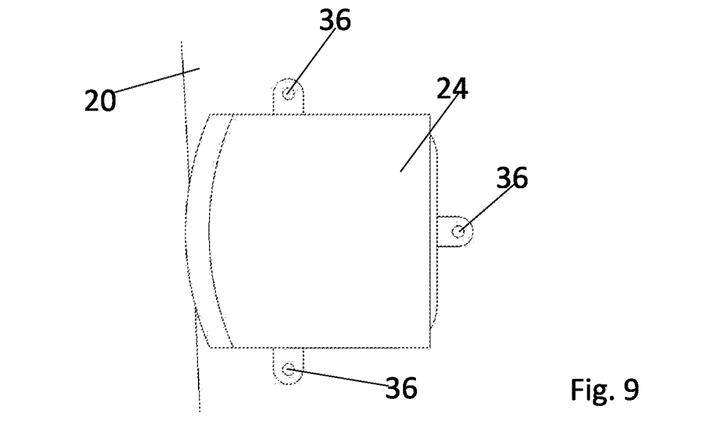
FIG. 9 is a top view of the roof module in the area of an environment sensor.
Figure 10:
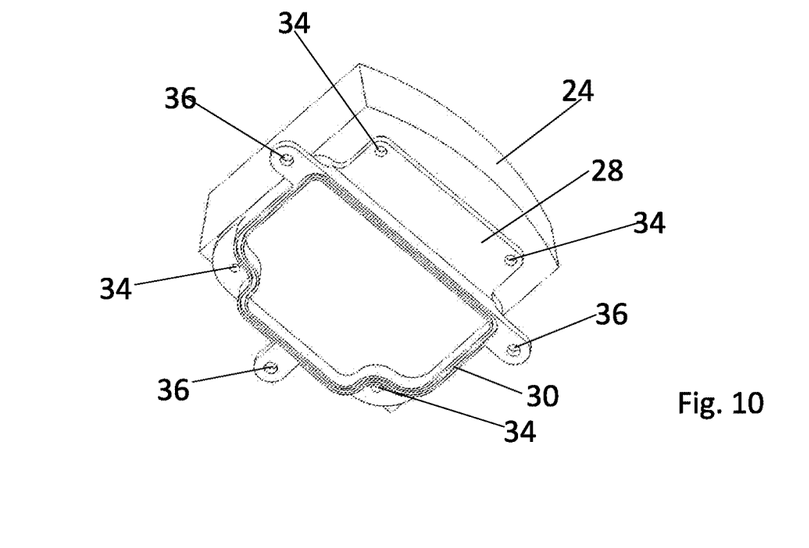
FIG. 10 is a perspective bottom view of the environment sensor with a holder illustrated in isolation.
Figure 11:
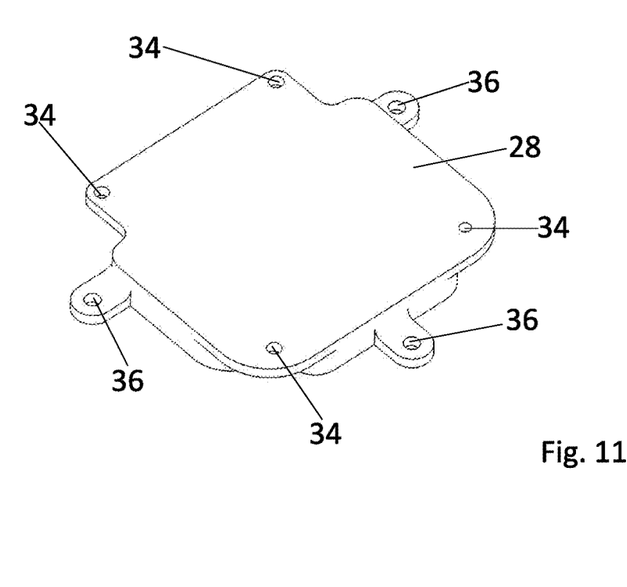
FIG. 11 is a perspective view of the holder in isolation.
Figure 12:
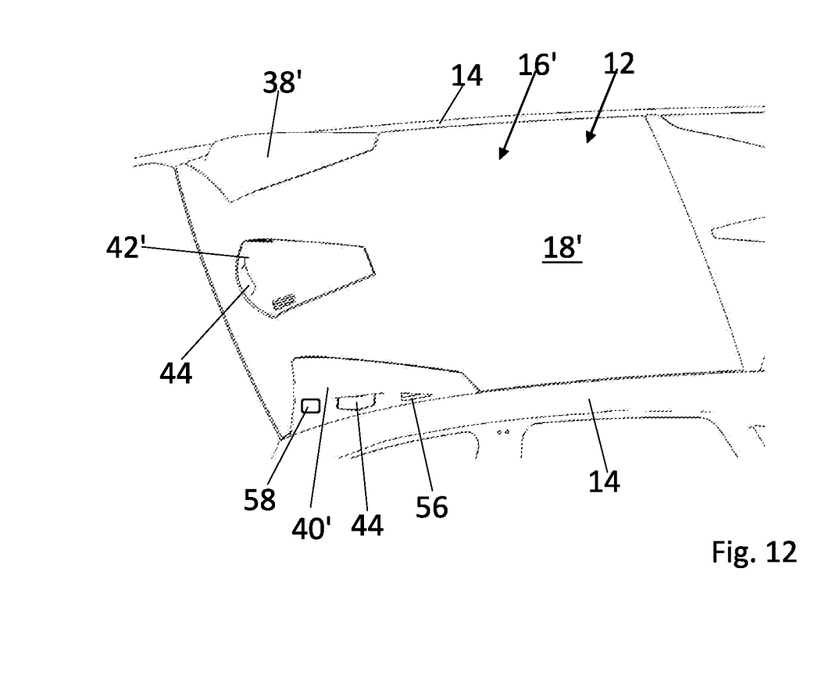
FIG. 12 is a perspective top view of a motor vehicle with an alternative embodiment of a roof module according to the invention.
Figure 13:
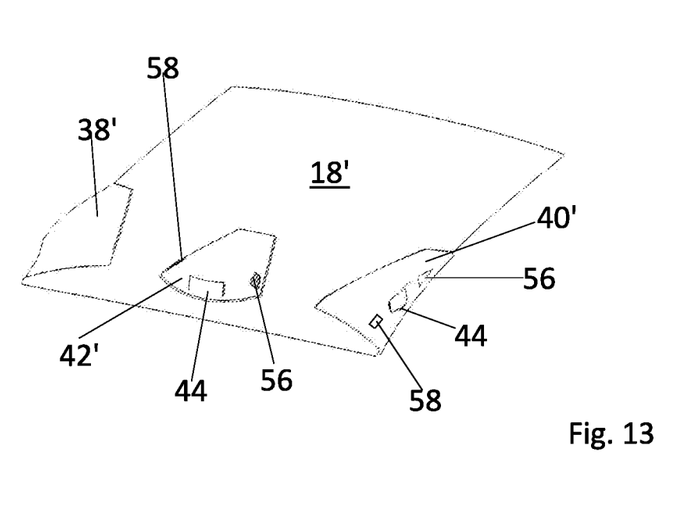
FIG. 13 is a perspective top view of the roof module of FIG. 12 in isolation.
Figure 14:
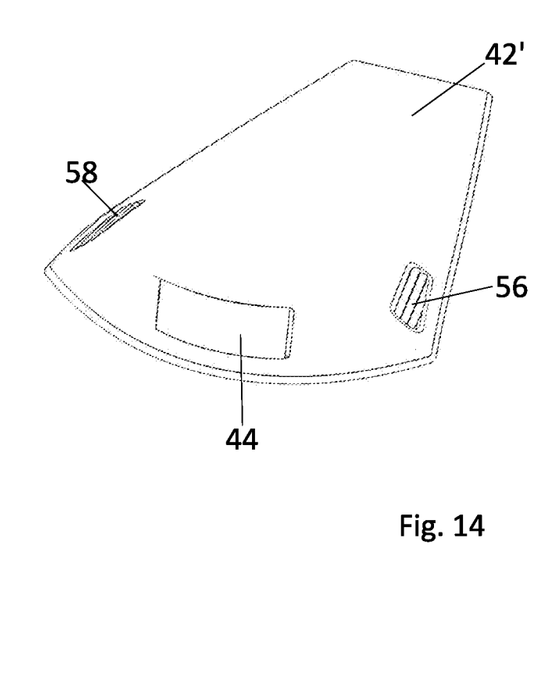
FIG. 14 is a perspective illustration of a dome of a roof skin of the roof module of FIG. 12.
Figure 15:
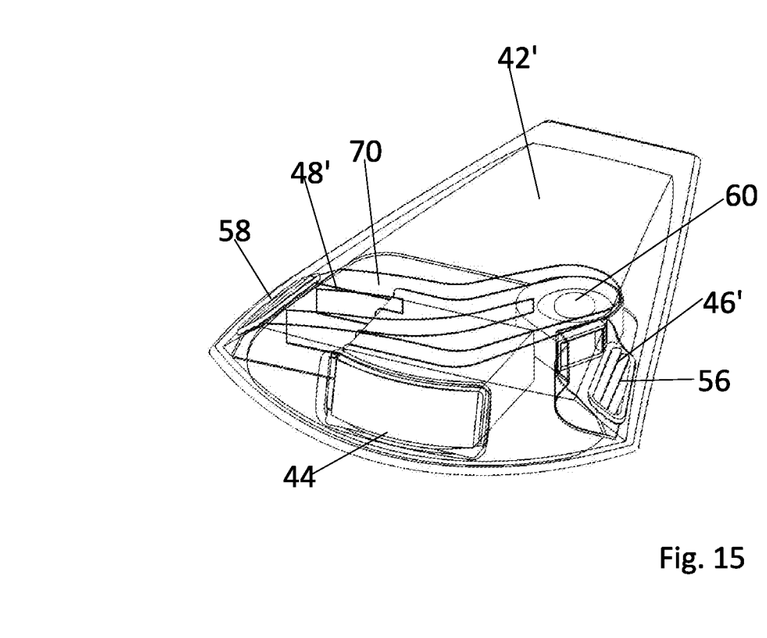
FIG. 15 is an illustration of the dome corresponding to FIG. 14 but in a semi-transparent illustration.
Figure 16:
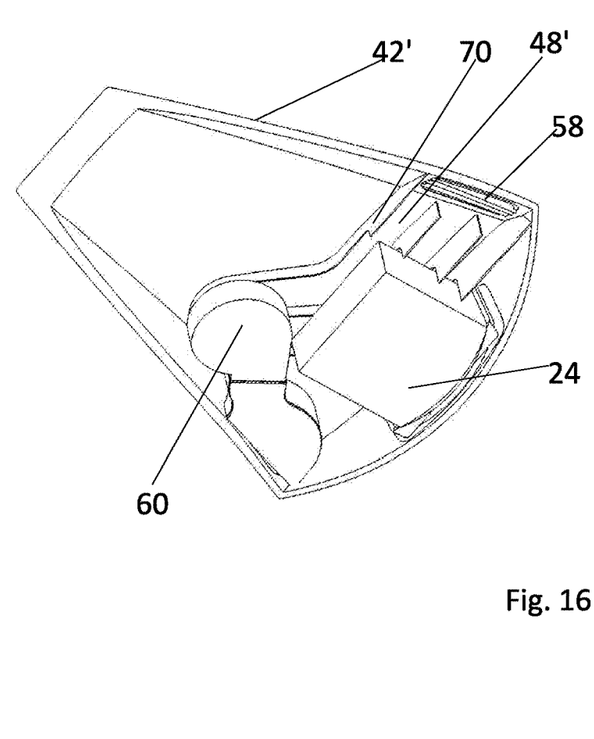
FIG. 16 is a perspective bottom view of the dome together with a sensor module and a fan.
Figure 17:
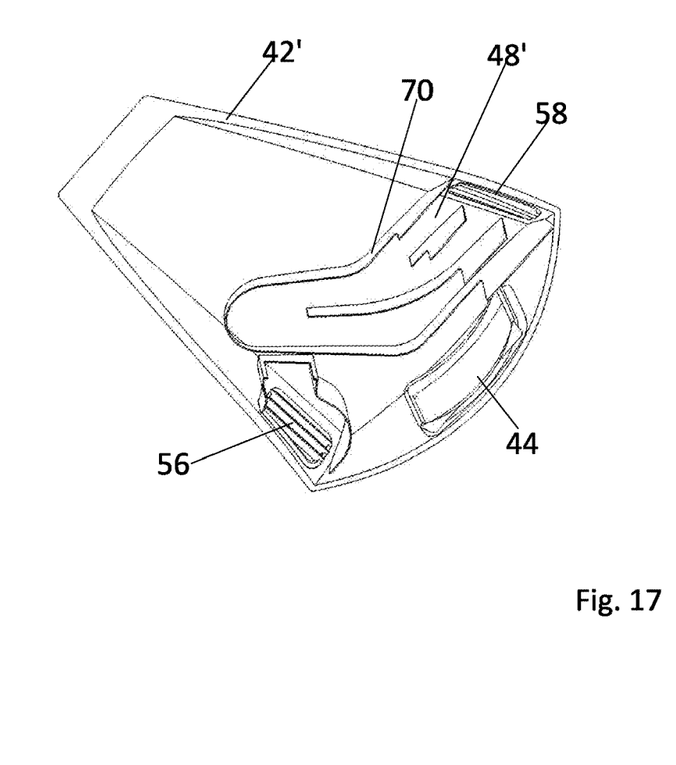
FIG. 17 is a perspective bottom view of the dome in isolation.

FIG. 1 shows a motor vehicle 10, which is a passenger car and provided with a vehicle roof 12, which comprises a roof side rail 14 on either side of a vertical longitudinal center vehicle plane, each roof side rail 14 being part of a vehicle body, which is a carcass. Vehicle roof 12 comprises a roof module 16 between roof side rails 14, roof module 16 forming a structural unit and being attached to roof side rails 14, which form a carcass support structure.

Roof module 16, which is illustrated in detail in FIGS. 2 to 10, comprises a multi-part roof skin 18, which is attached to a circumferential roof frame 20, which is a support of roof module 16 and forms a point of intersection of roof module 16 with the vehicle body.

Roof module 16 is a roof sensor module (RSM), which is equipped with devices enabling motor vehicle 10 to drive autonomously. To this end, roof module 16 has a sensor system comprising two lateral environment sensors 22 and 24 in a front portion with respect to the longitudinal center vehicle plane and one environment sensor 26 disposed centrally. Environment sensors 22, 24 and 26 can detect the vehicle environment so that motor vehicle 10 can drive autonomously. A current traffic situation can be determined by evaluating the measuring signals of environment sensors 22, 24 and 26 by means of a controller of motor vehicle 10, which allows motor vehicle 10 to autonomously or automatically adapt to the current traffic situation and behave accordingly.

Environment sensors 22, 24 and 26 can be configured in various ways and can comprise a lidar sensor, a radar sensor, a camera and/or another suitable type of sensor, for example.

As environment sensor 24 in the drawing illustrates, environment sensors 22, 24 and 26 are each disposed on a plate-like holder 28, which is provided with a circumferential seal 30 at its underside, seal 30 being disposed in a groove and each holder 28 resting on roof frame 20 via seal 30. Seal 30 encloses a corresponding cutout 32 in roof frame 20.

Environment sensors 22, 24 and 26 are connected to respective plate-shaped holders 28 from below via screw connections 34. Holders 28 are connected to roof frame 20 from above via screw connections 36, respective optionally provided screw tabs of holders 28 being additionally sealed toward roof frame 20. If the holder can be screwed to the roof frame from below in a non-illustrated manner in an alternative embodiment, it is possible for the screw tabs of the holder to be arranged within the circumferential seal of the holder toward the roof frame. Screw seals may be dispensed with in this case.

Roof skin 18 comprises domes 38, 40 and 42, under each of which one of environment sensors 22, 24 and 26 is disposed. Domes 38, 40 and 42 can be removed from the surrounding roof skin for maintenance and installation purposes and each comprise a window-like sensor see-through area 44, through which respective environment sensors 22, 24 and 26 can detect an area of the vehicle environment.

In order to be able to cool environment sensors 22, 24 and 26 and thus keep them at an intended operating temperature, a cooling feature 46 is provided, which comprises an air duct 48, which runs between an inlet 52, which is disposed under dome 40, and an outlet 54, which is disposed under dome 38, in the form of pipes 50 under roof frame 20. Dome 40 is provided with air inlet slots 56, i.e., air inlet openings, so that air can be aspirated. Dome 38 is provided with air outlet slots 58, i.e., air outlet openings, so that air can be expelled. Fans 60, which transport the air through pipes 50, are disposed in pipes 50. Furthermore, cooling elements 62 are disposed in pipes 50, which form air duct 48, cooling elements 62 being cooled by the aspirated air and being connected to cooling plates 66 via thermally conductive elements 64, which are what is referred to as heat pipes, cooling plates 66 each forming a heat pipe connection and being disposed at the undersides of holders 28 of environment sensors 22, 24 and 26.

Together with environment sensors 22 and 24, inlet 52 and outlet 54 of air duct 48, which is part of cooling feature 46, are located in the wet area, which moisture from the vehicle environment can enter, whereas thermally conductive elements 64, which extend between cooling elements 62 and cooling plates 66 of holders 28 for environment sensors 22, 24 and 26, are located in the dry area of vehicle roof 12, which is sealed from the wet area.

FIGS. 12 to 17 show a roof module 16', which is an alternative embodiment and which is also part of a vehicle roof 12 of a motor vehicle 10. As in the embodiment of FIGS. 1 to 11, roof module 16' comprises a multi-part roof skin 18', which is provided with two lateral domes 38' and 40' in a front portion with respect to the vertical longitudinal center vehicle plane and with a centrally disposed dome 42', which are each a part placed on top of otherwise continuous roof skin 18. Domes 38', 40' and 42' each also comprise a sensor see-through area 44 for environment sensors 22, 24 and 26, which are disposed under respective domes 38', 40' and 42'.

For forming a cooling feature 46', domes 38', 40' and 42' each comprise an air inlet, which is formed by slots 56, and an air outlet, which is formed by slots 58. Air-guiding ribs 70 are formed integrally on the underside or the inner side of each of domes 38', 40' and 42', which are made of plastic, air-guiding ribs 70 forming air ducts 48', in which respective environment sensors 22, 24 and 26 are disposed. Air aspirated through air inlet slots 56 can thus flow around and cool respective environment sensors 22, 24 and 26 and flow out again through air outlet slots 58. A fan 60 for aspirating and expelling the air is disposed under each of domes 38', 40' and 42'.

The invention claimed is:

1. A vehicle roof, in particular for a passenger car, the vehicle roof comprising:
   a one-part or multi-part roof skin,
   at least one environment sensor for detecting a vehicle environment,
   the environment sensor being disposed below the roof skin and being able to detect the vehicle environment through a sensor see-through area of the roof skin, and
   a cooling feature for cooling the environment sensor,
   at least part of the cooling feature being disposed in a wet area, and the environment sensor being disposed in the wet area.

2. The vehicle roof according to claim 1, wherein the cooling feature comprises at least one air duct in which a fan is disposed.

3. The vehicle roof according to claim 1, wherein a cooling element is disposed in the air duct, the cooling element being connected to a base of the environment sensor via at least one thermally conductive element.

4. The vehicle roof according to claim 3, wherein the base of the environment sensor is inserted into a cutout of a support, the support being covered by the roof skin.

5. The vehicle roof according to claim 4, wherein a circumferential seal is disposed on the base of the environment sensor, the seal interacting with the support and surrounding the cutout.

6. The vehicle roof according to claim 4, wherein the base of the environment sensor is a holder, which is attached to the support.

7. The vehicle roof according to claim 1, wherein the roof skin comprises at least one air inlet opening and at least one air outlet opening, which allow air to flow through the cooling feature.

8. The vehicle roof according to claim 1, wherein air-guiding ribs, which form an air duct of the cooling feature, are formed on an inner side of the roof skin.

9. The vehicle roof according to claim 8, wherein the environment sensor is located in the air duct formed by the air-guiding ribs.

10. The vehicle roof according to claim 1, wherein the roof skin comprises at least one removable dome under which the environment sensor is disposed.

11. The vehicle roof according to claim 1, wherein it is a roof module.

12. A motor vehicle comprising a vehicle roof according to claim 1.

13. The vehicle roof according to claim 4, wherein the support being covered by the roof skin is formed by a roof frame.

14. The vehicle roof according to claim 6 wherein the base of the holder is attached to the support from above.

\* \* \* \* \*